US009178980B2

(12) United States Patent
Shimizu et al.

(10) Patent No.: US 9,178,980 B2
(45) Date of Patent: Nov. 3, 2015

(54) INFORMATION PROCESSING PROGRAM, INFORMATION PROCESSING DEVICE AND INFORMATION PROCESSING METHOD

(75) Inventors: Ryo Shimizu, Tokyo (JP); Makoto Kondo, Kawasaki (JP)

(73) Assignee: UBIQUITOUS ENTERTAINMENT INC., Tokyo (JP)

( * ) Notice: Subject to any disclaimer, the term of this patent is extended or adjusted under 35 U.S.C. 154(b) by 982 days.

(21) Appl. No.: 12/890,813

(22) Filed: Sep. 27, 2010

(65) Prior Publication Data

US 2011/0074546 A1    Mar. 31, 2011

(30) Foreign Application Priority Data

Sep. 30, 2009 (JP) ................................. 2009-229152

(51) Int. Cl.
| | |
|---|---|
| G06F 15/16 | (2006.01) |
| G08B 5/22 | (2006.01) |
| G06F 3/00 | (2006.01) |
| H04M 1/725 | (2006.01) |
| G06Q 10/10 | (2012.01) |

(52) U.S. Cl.
CPC ........... H04M 1/72563 (2013.01); G06Q 10/10 (2013.01); H04M 1/72566 (2013.01); H04M 1/72572 (2013.01)

(58) Field of Classification Search
CPC ............................... G06F 3/0482; G08B 5/22
USPC ........... 340/6.1, 6.11; 709/228, 200; 715/764, 715/708
See application file for complete search history.

(56) References Cited

U.S. PATENT DOCUMENTS

| | | | |
|---|---|---|---|
| 5,754,179 A | 5/1998 | Hocker et al. | |
| 7,437,358 B2 * | 10/2008 | Arrouye et al. | ........................ 1/1 |
| 7,730,047 B2 * | 6/2010 | Hugill et al. | ................... 707/705 |
| 7,908,562 B2 * | 3/2011 | McKee et al. | .................. 715/764 |
| 8,607,166 B2 * | 12/2013 | Jalon et al. | ..................... 715/838 |
| 8,745,513 B2 * | 6/2014 | Crystal | ......................... 715/764 |
| 8,762,896 B2 * | 6/2014 | Lee et al. | ....................... 715/864 |
| 2003/0046304 A1 | 3/2003 | Peskin et al. | |
| 2003/0103603 A1 * | 6/2003 | Kurita et al. | .................. 379/67.1 |
| 2007/0162322 A1 * | 7/2007 | Shahine et al. | ..................... 705/9 |
| 2009/0100332 A1 * | 4/2009 | Kanjilal et al. | ................ 715/235 |
| 2009/0158200 A1 * | 6/2009 | Palahnuk et al. | ............. 715/781 |

FOREIGN PATENT DOCUMENTS

| | | |
|---|---|---|
| JP | 08-339286 A | 12/1996 |
| JP | 2001-306207 A | 11/2001 |
| JP | 2003-162512 A | 6/2003 |
| JP | 2006-060431 A | 3/2006 |
| JP | 2008-112319 A | 5/2008 |

* cited by examiner

*Primary Examiner* — Nam V Nguyen
(74) *Attorney, Agent, or Firm* — Novak Druce Connolly Bove + Quigg LLP

(57) ABSTRACT

A card (which is displayed on a screen by the card application and is thus operated, and has a single function) is output to a display of an information processing device through a shell (an OS for controlling card application and a seal application), and a seal (a display associated with an action such as an output) can be placed on a part of the card. The seal placed on the card is written to a seal DB and the seal placed on the card is displayed in accordance with information of the seal DB when the card is to be output. The seal corresponds to a seal application depending on each type. When an object of the card having the seal placed thereon is coincident with a predetermined condition, the corresponding seal application is activated by the shell so that a predetermined action such as a notice or an output of a ring tone is executed.

4 Claims, 14 Drawing Sheets

F I G. 1
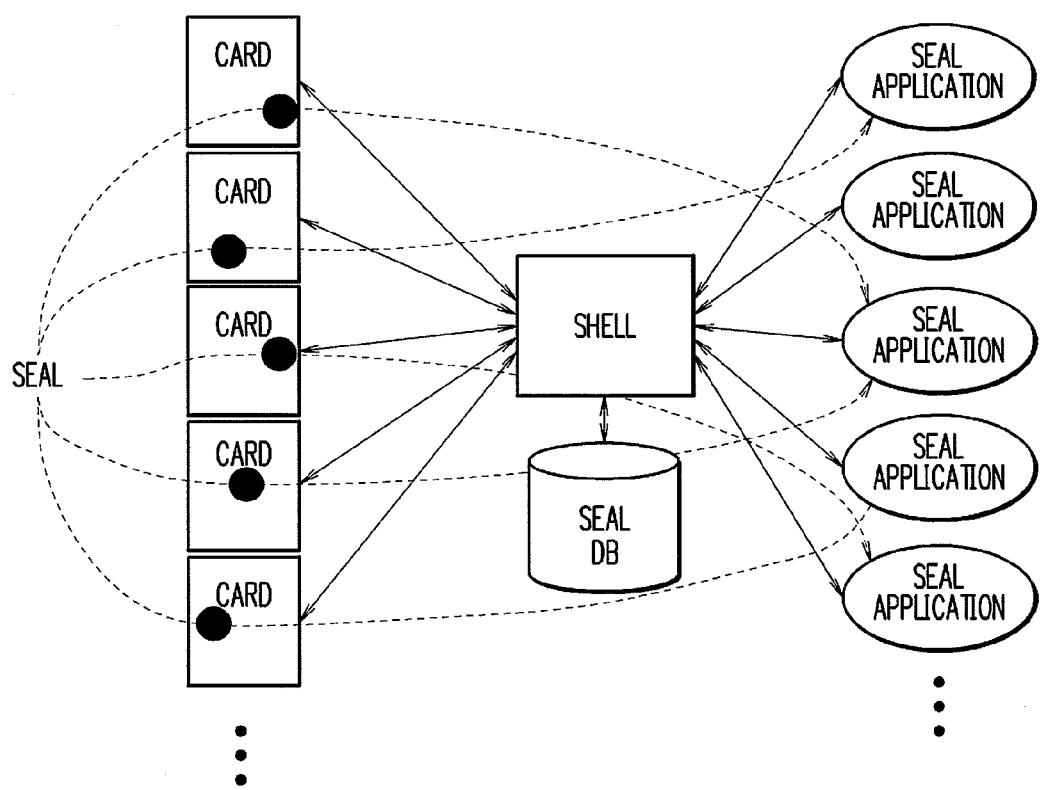

F I G. 5
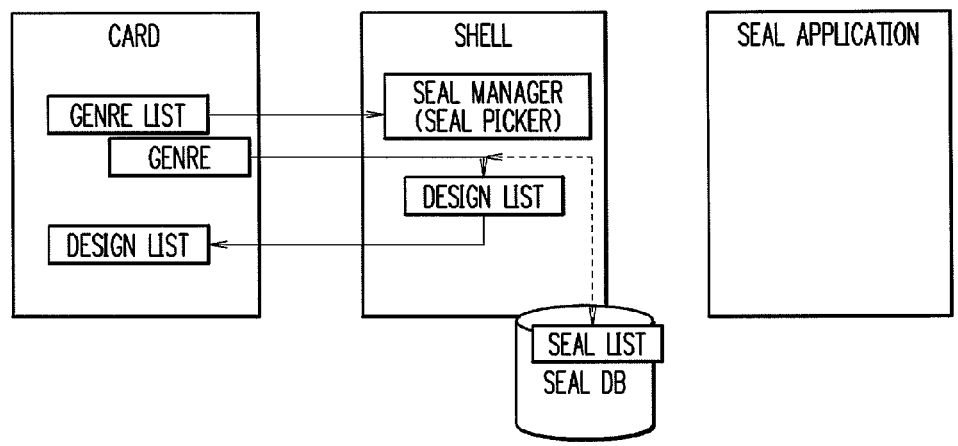
F I G. 6
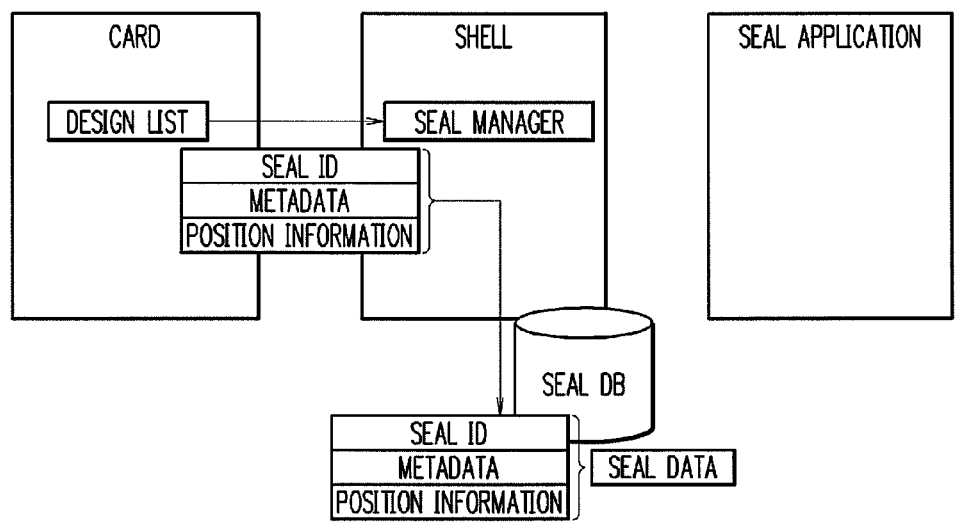

F I G. 11
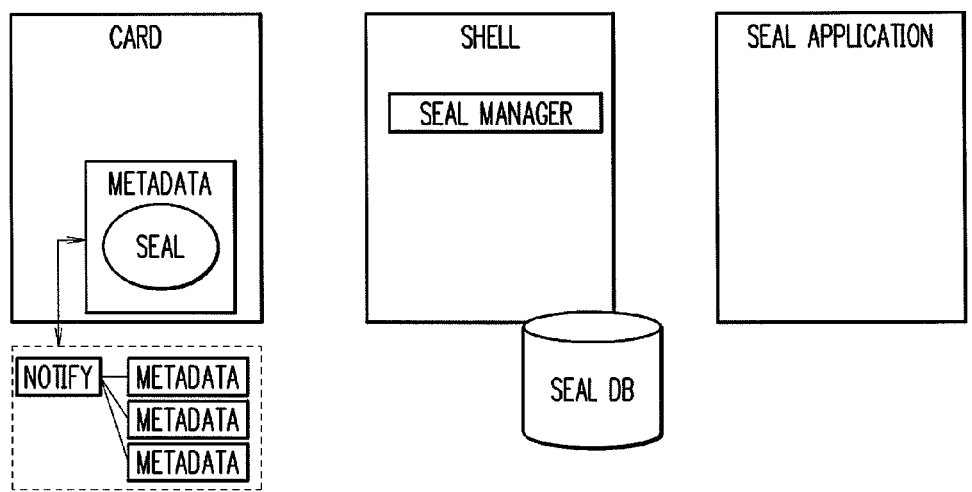
F I G. 12
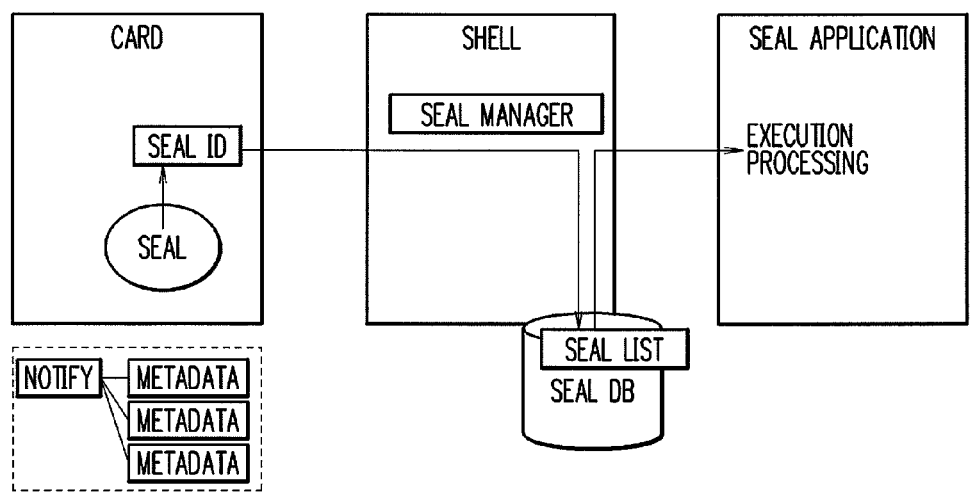

F I G. 17
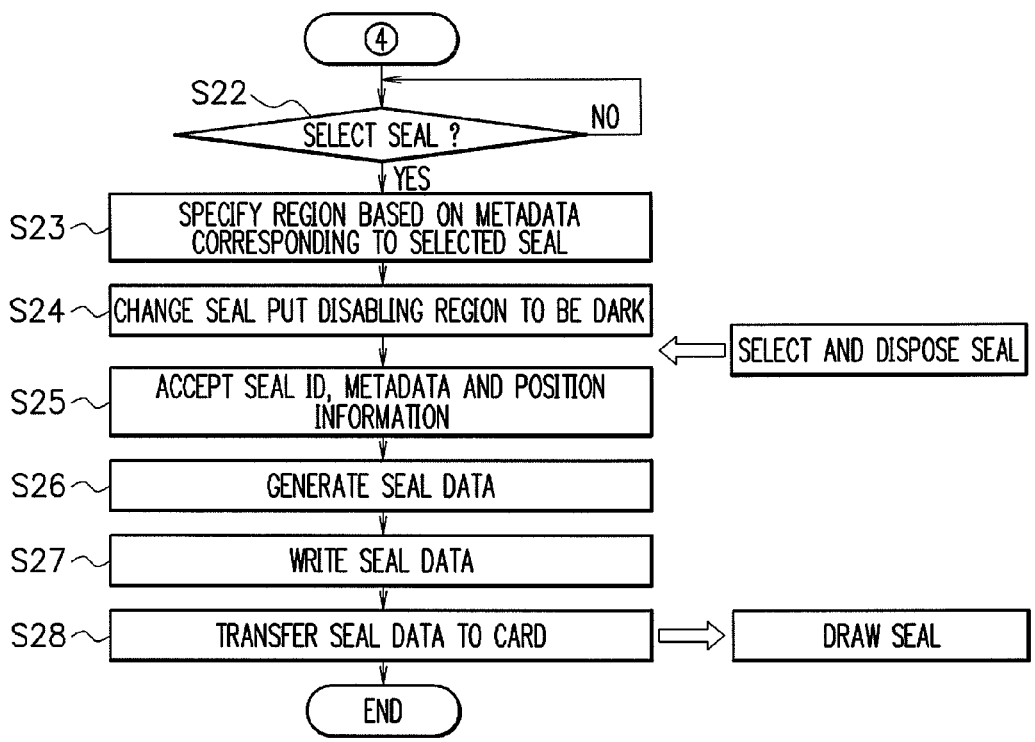
F I G. 18
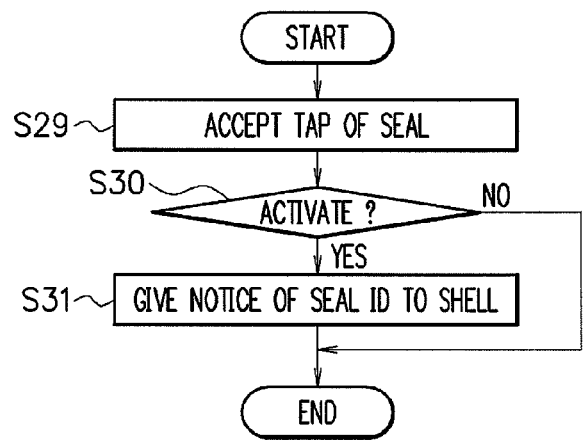

FIG. 21

| METADATA | GENRE | SEAL ID |
|---|---|---|
| LABEL | ORDINARY SEAL<br>FAVORITE SEAL | 001, 002, 003, 004, 005<br>201, 202, 203 |
| TIME | ORDINARY SEAL<br>ALARM SEAL | 001, 005, 006<br>101, 102, 103, 104, 105, 106 |
| LOCATION | ALARM SEAL<br>FAVORITE SEAL | 101, 103, 105, 106, 107<br>202, 204, 205 |
| ADDRESS | ORDINARY SEAL<br>ALARM SEAL | 002, 007, 008<br>101, 103, 107, 108 |
| IMAGE | ORDINARY SEAL | 009 |
| PERSON | ORDINARY SEAL<br>ALARM SEAL | 003, 010, 011, 012<br>101, 102, 109 |
| URL | ORDINARY SEAL | 001, 013, 014 |
| ⋮ | | |

FIG. 22

| SEAL ID | SEAL DESIGN | SEAL APPLICATION |
|---|---|---|
| 001 | ・・・/・・・/design/ 001.jpg | ・・・/・・・/sealappri001 |
| 002 | ・・・/・・・/design/ 002.jpg | ・・・/・・・/sealappri002 |
| 003 | ・・・/・・・/design/ 003.jpg | ・・・/・・・/sealappri003 |
| 004 | ・・・/・・・/design/ 004.jpg | ・・・/・・・/sealappri004 |
| 005 | ・・・/・・・/design/ 005.jpg | ・・・/・・・/sealappri005 |
| 006 | ・・・/・・・/design/ 006.jpg | ・・・/・・・/sealappri006 |
| 007 | ・・・/・・・/design/ 007.jpg | ・・・/・・・/sealappri007 |
| ⋮ | | |

F I G. 25
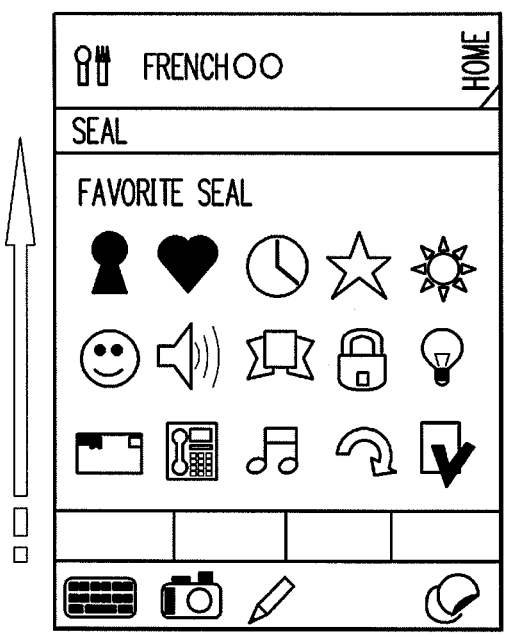

INFORMATION PROCESSING PROGRAM, INFORMATION PROCESSING DEVICE AND INFORMATION PROCESSING METHOD

BACKGROUND OF THE INVENTION

[1. Field of the Invention]

The present invention relates to an information processing program, an information processing device and an information processing method which execute a predetermined action corresponding to a seal displayed on a card screen displayed on a display.

[2. Description of the Related Art]

Various functions such as a schedule control and a transmission/receipt of an electronic mail which are offered through a personal computer, a portable telephone, a PDA or the like are implemented by an application program which is compatible with each of the functions, for example, a scheduler, a mailer or the like. A large number of processes are executed in accordance with the application program through a predetermined input operation carried out by a user. However, there are also offered some processes to be automatically executed in accordance with the application program when a predetermined event is generated by causing the user to previously set some event as a trigger.

For example, there is disclosed an invention related to the technique for setting, as a trigger, an event in relation to distance information or position information which is detected by a device, traffic information or weather information which is received by the device, or the like. Then automatically displaying information corresponding to each event in a generation of the set event in addition to a function for setting, as a trigger, an event of an arrival of a predetermined date and time, thereby automatically giving a notice of a schedule when the date and time is reached in an application program (a scheduler) for a schedule control (for instance, see Patent Document 1: Japanese Laid-Open Patent Publication No. 2003-162512).

In another example of the application program, there is disclosed an invention related to the technique for setting, as a trigger, an event of an incoming mail from a predetermined transmitter and reproducing a ring tone set for every transmitter when the incoming mail arrives in an application program (a mailer) for receiving a mail such as a chat mail (for instance, see Patent Document 2: Japanese Laid-Open Patent Publication No. 2006-060431).

In the examples described in the Patent Documents 1 and 2, the event designated by a user (a condition related to a date and time, a position, traffic, weather or the like, an incoming mail from a predetermined transmitter, or the like) is set as a trigger for executing a predetermined action (a display of a notice or information, a reproduction of a ring tone or the like) in each of the application programs. However, it can be supposed that the methods are limited in the following respects.

First of all, the event set as the trigger for executing the predetermined action cannot be visually grasped by the user. For example, in the case in which a computer is not utilized but a notebook is used to control a schedule, a seal capable of distinguishing each event is put on a corresponding date and time portion of a calendar with respect to a date and time that a meeting or an appointment is planned, a memorial day or the like in such a manner that it is possible to visually recognize a date and time that the event is planned and the type of event. In the examples described in the Patent Documents 1 and 2, however, importance is attached to an object for giving a notice of an event or the like and there is no consideration for using an attainment of an object to visually grasp an event of which notice is set to be given, or the like.

Secondly, both an action which can be executed and an event which can be set to execute the action depend on the respective application programs. For this reason, it is impossible to flexibly set their combination. For example, an original sound effect is prepared for the action which can be executed. It is necessary to carry out setting for adding, as an action capable of being executed, a reproduction of the sound effect to an application program for a schedule control if the reproduction is to be utilized for a notice given when a predetermined date and time arrives and to an application program for a mail transmission/receipt if the same reproduction is to be utilized for giving a notice of an incoming mail from a predetermined transmitter, respectively.

In other words, there are restrictions that a user can only use a combination of an event and an action which are offered by each of the application programs, while there is attached a condition that a provider of the application program should offer, as a set, both a program for controlling an event and a program for executing an action.

DISCLOSURE OF THE INVENTION

In order to solve the problems described above, it is an object of the present invention to provide an information processing program, an information processing device and an information processing method in which a user can visually grasp an event of which notice or the like is set to be given and a type of an action to be executed, a combination of the event and the action to be executed can be set flexibly, and a predetermined action is executed corresponding to a seal displayed on a card screen displayed on a display.

In order to achieve the object, the present invention provides an information processing program for executing a predetermined action corresponding to a seal displayed on a card screen that is displayed on a display. An information processing device including a card information storing portion for storing card information to be used for generating a certain card screen to be displayed on a display is provided. An action information storing portion for associating a type of a seal to be displayed for indicating an association with a predetermined action on the card screen displayed on the display with a program for executing a predetermined action corresponding to the type of the seal and storing them is also provided. A seal display information storing portion for storing seal display information to be used for displaying the seal on a predetermined region of the card screen displayed on the display based on the card information being caused to execute a card information reading step of reading one of the card information from the card information storing portion when accepting a designation of the card information is also included. A seal information reading step of reading, from the seal display information storing portion, seal display information about a seal displayed on the card screen displayed based on the card information read by the card information reading step and a card screen outputting step of drawing the seal based on the seal display information read at the seal information reading step over the card screen generated in accordance with the card information read at the card information reading step and outputting the seal to the display are also included. A program specifying step of specifying a type of a seal corresponding to the seal display information and specifying a program associated with the type of the seal in the action information storing portion when detecting a generation of a predetermined event associated with a predetermined region of the card screen on which the seal is to be displayed based on the seal display information stored in the seal display information storing portion is also provided. An action executing step of causing the program specified at the program specifying step to execute a processing related to a predetermined action is also provided.

In the present invention, information having a single function and displayed on a screen, for example, a calendar screen to be displayed by a scheduler, a screen of an address book to be displayed by a mailer or the like is managed as card information, and an action to be executed in relation to corresponding information to a predetermined region (an object) over each screen is displayed as a seal on the card screen. Consequently, it is possible to cause a user to visually grasp an event of which notice or the like is set and a type of an action to be executed. By employing a structure in which card information on the card screen which is intended for displaying a seal and information about a corresponding action to a type of the seal are managed separately from each other and both of them are related to each other based on seal display information about the seal to be displayed on each card screen. Furthermore, it is possible to flexibly set a combination of the event and the action to be executed.

Moreover, the present invention can also have a feature that in the information processing device, the card information stored in the card information storing portion is constituted to include at least one metadata and the seal display information stored in the seal display information storing portion has a type of a seal to be displayed which is specified by the metadata included in the card information. The information processing device is provided with seal type information storing portion for storing the type of the seal which can be displayed on the card screen for each metadata included in the card information. The information processing device is caused to execute a seal list outputting step of identifying the metadata included in card information corresponding to the card screen displayed on the display from the card information, reading the type of the seal which can be displayed on the card screen corresponding to the metadata from the seal type information storing portion, and generating a list of the seals which can be displayed and outputting the seal list to the card screen. Further, a seal display information writing step of writing, to the seal display information storing portion, new seal display information to be used for displaying a seal selected in the seal list on the card screen is provided.

By employing a structure in which a seal list which can be displayed is generated from metadata of an object included in card information corresponding to a displayed card screen and the seal list is output to the card screen, and a user can select a seal to be displayed on the card screen from the seal list, it is possible to enhance when the user sets an action such as a notice to an event displayed on the card screen.

Furthermore, the present invention may have a feature that the information processing device is caused to execute a seal selection accepting step of accepting a selection of one of the seals from the seal list output at the seal list outputting step, and a position information selection accepting step of accepting a selection of predetermined position information on the display as a display position for the seal in a state in which the seal is selected. Also new seal display information is written by setting the seal accepted to be selected at the seal selection accepting step as a seal to be displayed on a corresponding region to the position information at the seal display information writing step.

By employing a structure in which seal display information for displaying a new seal is automatically written if a display position is designated for the seal selected from the seal list output to the card screen through an operation such as a touching and dragging operation, it is possible to enhance when a user sets an action such as a notice to an event displayed on the card screen.

In addition, the present invention may have a feature that the information processing device is caused to execute a metadata specifying step of specifying metadata which can be displayed for a type of one of the seals selected by referring to the seal type information storing portion when accepting the selection of the seal at the seal selection accepting step. The present invention may also have a display state changing step of specifying a corresponding display region to the metadata specified at the metadata specifying step from card information corresponding to the card screen displayed on the display and changing a display state of the card screen so as to enable an identification of the display region. The present invention may also have new seal display information that is written at the seal display information writing step when accepting, at the position information selection accepting step, a selection of position information included in the display region corresponding to the metadata specified at the display state changing step.

By employing a structure in which a display state is changed to enable an identification of a display region capable of displaying a seal, for example, the other display regions are changed to be dark when a user selects a seal from a seal list output to a card screen. Thus it is possible to visually grasp an event to which an action can be set when the user sets an action such as a notice to an event displayed on the card screen.

Moreover, the present invention may have a feature that in the information processing device, the card information stored in the card information storing portion is constituted to include at least one metadata and the seal display information stored in the seal display information storing portion has a type of a seal to be displayed which is specified by the metadata included in the card information. The generation of a predetermined event is detected based on a coincidence, with a predetermined condition, of data corresponding to the metadata included in the seal display information stored in the seal display information storing portion at the program specifying step.

By employing a structure in which the coincidence of the corresponding data to the metadata with the predetermined condition, for example, an arrival of a predetermined date and time or an incoming mail from an address of a predetermined transmitter is recognized as a generation of an event and an action such as a notice is executed. Thus it is possible to automatically execute a predetermined action in response to an arrival of a date and time displayed on the card screen based on the corresponding data to the metadata, an incoming mail from a transmitter displayed on the card screen based on the corresponding data to the metadata or the like even if a user does not carry out an operation for tapping a seal displayed on the card screen or the like.

The present invention can also be specified as an information processing device including the information processing program.

The present invention provides an information processing device for executing a predetermined action corresponding to a seal displayed on a card screen displayed on a display. The information processing device includes a card information storing portion for storing card information to be used for generating a certain card screen to be displayed on a display and an action information storing portion for associating a type of a seal to be displayed for indicating an association with a predetermined action on the card screen displayed on the display with a program for executing a predetermined action corresponding to the type of the seal for and storing them. The information processing device includes a seal display information storing portion for storing seal display information to be used for displaying the seal on a predetermined region of the card screen displayed on the display based on the card information, and a card information reading portion for reading one of the card information from the card information storing portion when accepting a designation of the card information, a seal information reading portion for reading, from the seal display information storing portion, seal display information about a seal displayed on the card screen displayed based on the card information read by the card information reading portion. The information processing device also includes a card screen outputting portion for drawing the seal based on the seal display information read by the seal display information reading portion over the card screen generated in accordance with the card information read by the card information reading portion and outputting the seal to the display. The information processing device includes a program specifying portion for specifying a type of a seal corresponding to the seal display information and specifying a program associated with the type of the seal in the action information storing portion when detecting a generation of a predetermined event associated with a predetermined region of the card screen on which the seal is to be displayed based on the seal display information stored in the seal display information storing portion, and an action executing portion for causing the program specified by the program specifying portion to execute a process related to a predetermined action.

Moreover, the present invention can also provide the information processing device, wherein the card information stored in the card information storing portion is constituted to include at least one metadata and the seal display information stored in the seal display information storing portion has a type of a seal to be displayed which is specified by the metadata included in the card information. The information processing device including a seal type information storing portion for storing the type of the seal which can be displayed on the card screen for each metadata included in the card information, and a seal list outputting portion for identifying the metadata included in card information corresponding to the card screen displayed on the display from the card information, reading a type of a seal which can be displayed on a display region corresponding to the metadata from the seal type information storing portion, and generating a list of seals which can be displayed and outputting the seal list to the card screen. The information processing device also includes a seal display information writing portion for writing, to the seal display information storing portion, new seal display information to be used for displaying a seal selected in the seal list on the card screen.

Furthermore, the present invention may provide the information processing device, further including a seal selection accepting portion for accepting a selection of one of the seals from the seal list output to the seal list outputting portion, and a position information selection accepting portion for accepting a selection of predetermined position information on the display as a display position for the seal in a state in which the seal is selected. The information processing device also includes a seal display information writing portion writing new seal display information by setting the seal accepted to be selected in the seal selection accepting portion as a seal to be displayed on a corresponding region to the position information.

In addition, the present invention may provide the information processing device, further including a metadata specifying portion for specifying metadata which can be displayed for a type of one of the seals selected by referring to the seal type information storing portion when the seal selection accepting portion accepts the selection of the seal. The information processing device also includes a display state changing portion for specifying a corresponding display region to the metadata specified by the metadata specifying portion based on card information corresponding to the card screen displayed on the display and changing a display state of the card screen so as to enable an identification of the display region. The information processing device also includes a seal display information writing portion writing new seal display information when the position information selection accepting portion accepts a selection of position information included in the display region corresponding to the metadata specified by the display state changing portion.

Moreover, the present invention may provide the information processing device, wherein the card information stored in the card information storing portion is constituted to include at least one metadata, the seal display information stored in the seal display information storing portion has a type of a seal to be displayed which is specified by the metadata included in the card information, and the program specifying portion detects a generation of a predetermined event based on a coincidence, with a predetermined condition, of data corresponding to the metadata included in the seal display information stored in the seal display information storing portion.

The present invention can also be specified as an information processing method to be executed in accordance with the information processing program or by the information processing device.

According to the present invention, it is possible to visually grasp an event of which notice or the like is set and a type of an action to be executed by a user. The present invention also allows a user to flexibly set a combination of the event and the action to be executed when setting an action such as an output of a notice, a reproduction of a ring tone or the like by setting, as an event, an arrival of a displayed date and time, an incoming mail from a transmitter or the like in a card screen for displaying information such as a calendar screen to be displayed by a scheduler, a screen of an address book to be displayed by a mailer or the like.

BRIEF DESCRIPTION OF THE DRAWINGS

FIG. 1 is a diagram showing an association of a card, a shell and a seal application which are used in the present invention.

FIG. 5 is a third diagram showing the processing flow for putting a seal on a card in accordance with the information processing program according to the present invention.

FIG. 6 is a fourth diagram showing the processing flow for putting a seal on a card in accordance with the information processing program according to the present invention.

FIG. 11 is a first diagram showing a processing flow for executing a predetermined action by setting a predetermined event as a trigger in accordance with the information processing program according to the present invention.

FIG. 12 is a second diagram showing the processing flow for executing a predetermined action by setting a predetermined event as a trigger in accordance with the information processing program according to the present invention.

FIG. 17 is a fifth flowchart showing the processing flow for displaying a card and putting a seal in accordance with the information processing program according to the present invention.

FIG. 18 is a first flowchart showing a processing flow for activating to execute a predetermined action in accordance with the information processing program according to the present invention.

FIG. 21 is a diagram showing an example of a table in which there are associated metadata and a type of a seal capable of being put in a seal list storing portion of the information processing device in accordance with the present invention.

FIG. 22 is a diagram showing an example of a table in which there are associated a type of a seal and an application program for executing a predetermined action in the seal list storing portion of the information processing device according to the present invention.

FIG. 25 is a third view showing the example of the transition of the seal selecting screen to be displayed on the display in accordance with the information processing program according to the present invention.

DETAILED DESCRIPTION OF THE PREFERRED EMBODIMENTS

Figure 2:
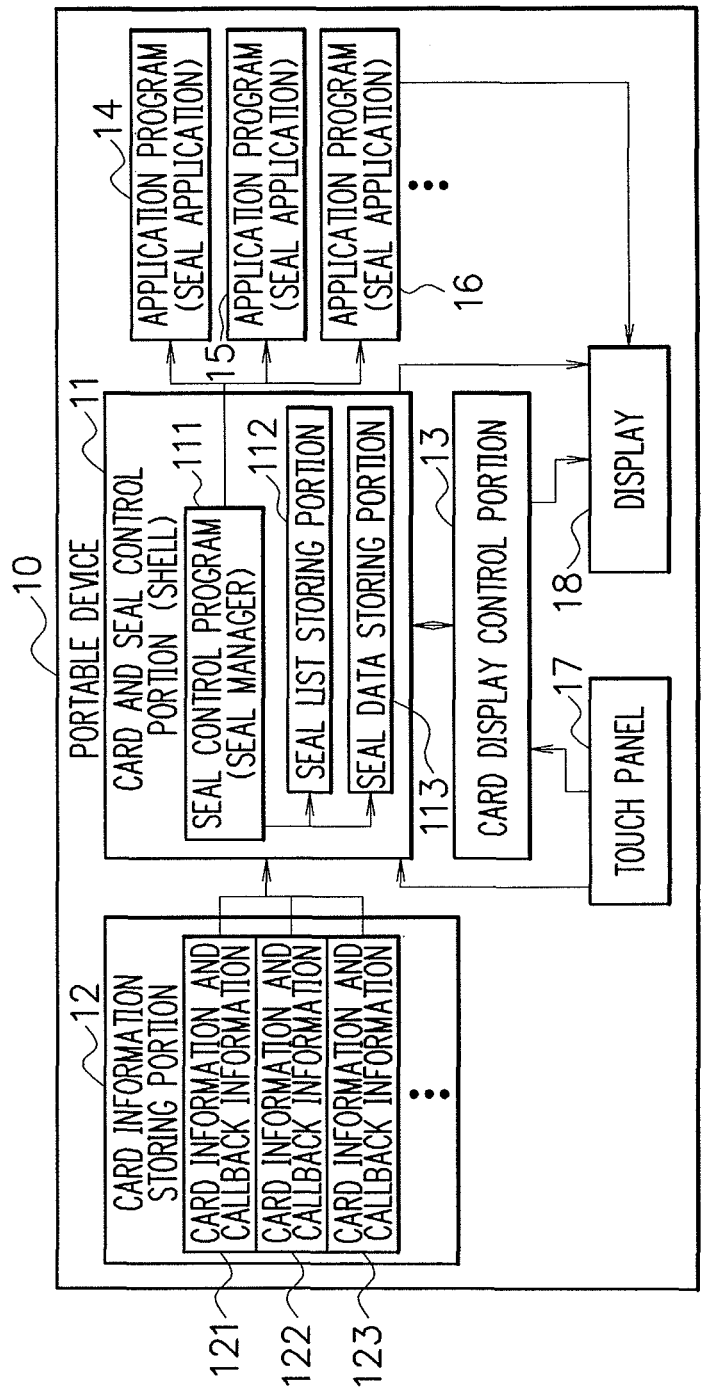
FIG. 2 is a block diagram showing a structure of an information processing device according to the present invention.

An embodiment for carrying out the present invention will be described below in detail with reference to the drawings. In the following description, explanation will be given to an example in which the present invention is applied to a portable device. However, the following description shows an example of the embodiment according to the present invention, and an information processing device which is used in the present invention, a type such as a card or a program to be used as a seal application and the like are not restricted to the embodiment.

FIG. 1 briefly shows an association of each of a card, a shell and a seal application which are used in the present invention and a function of a seal application corresponding to a seal to be placed on the card. An information processing program according to the present invention is operated by various computers, for example, a portable device such as a portable telephone or a PDA, a personal computer and the like, and is constituted to include three elements having a card application, a shell and a seal application which will be described below.

The card is a screen displayed on a display of a computer. A calendar screen to be displayed by a scheduler, a screen of an address book to be displayed by a mailer, a screen for displaying a shop guide such as the Web page and the like are equivalent types of screens.

The card application is an application program grasped as a unit having a single function, and is operated on the displayed card screen.

A seal which will be subsequently described can be placed (drawn) on an object included in the card (which is constituted by metadata and a set of the data, a region to be displayed on a screen, a URI and the like).

The seal is an image to be placed (drawn) on a part of the card which is displayed by the card application and a type of the seal is associated with some action, for example, an output, to a display, of a notice indicative of an arrival of a predetermined date and time, an output of a ring tone to a speaker, a record of an incoming voice, a record of an operation log or the like. For the image of the seal, it is preferable to use an image such as an icon with which each operation is closely associated (an image of a cake in the case of a notice of a birthday, a face photograph of a predetermined transmitter in the case of an incoming mail from the transmitter or the like). When a predetermined event is generated, for example, an object present in a region on which the seal is placed over the card is coincident with a predetermined condition, an action corresponding to the type of the seal is executed.

The seal application indicates an application program for executing an action corresponding to a type of a seal, and executes an operation such as an output of a notice, an output of a ring tone, a record of a voice, a record of an operation log or the like. The seal application is activated through the shell by setting the generation of the predetermined event as a trigger.

The shell indicates a program which is equivalent to an OS for controlling the card application and the seal application, and the card application is read by the shell and active card switching is controlled. Moreover, the shell controls operations for displaying a list of seals which can be put on the card, putting the seal on the card, that is, recording an object included in the card and placing the card in an associating seal DB, activating the seal application in a generation of a predetermined event and the like.

On the assumption of the foregoing, the present invention is operated in the following manner. When a user selects a card to be utilized through a shell, a screen corresponding to the card (for example, a screen of a calendar for controlling a schedule) is displayed on a display. In the case in which a seal is to be placed on a part of the card, the user selects a seal from a seal list which is displayed by the shell and determines an object on a card where the seal is to be placed (for example, any date on the calendar). An object of a card on which a seal is placed is written to the seal DB by the shell.

The seal DB stores information about the seal placed on the card. When the card is to be subsequently read, therefore, the placed seal is drawn in a position of a predetermined object on the card (for example, a column of a date designated over the calendar). The seal corresponds to the seal application depending on each type. When the object of the card on which the seal is placed is coincident with a predetermined condition (for example, the date designated over the calendar arrives), a corresponding seal application is activated by the shell so that a predetermined action (for example, a display of a notice indicative of the arrival of the date) is executed.

FIG. 2 shows a structure of the information processing device according to the present invention. Although a portable device such as a portable telephone or a PDA, a personal computer or the like is used for the information processing device according to the present invention, a type of hardware is not particularly restricted if the computer can execute a calculation process in accordance with a program. Description will be given on the assumption that the information processing device according to the present invention is set to be a portable device of a touch panel type.

A portable device 10 to be the information processing device according to the present invention includes a CPU, a main memory and a storage medium such as an HDD, and reads a program stored in the storage medium such as the HDD to the main memory and causes the CPU to execute a calculation process, thereby implementing a predetermined function.

The portable device 10 is constituted to include a card and seal control portion 11 which corresponds to the shell described with reference to FIG. 1, a card information storing portion 12 which correspond to the card described with reference to FIG. 1, a card display control portion 13 which correspond to the card application, application programs 14 to 16 which correspond to the seal application described with reference to FIG. 1, a touch panel 17 for inputting information, and a display 18 for outputting information.

The card and seal control portion 11 is functionally specified and a predetermined function is implemented by an application program such as a seal control program (seal manager) 111. The card display control portion 13 is also specified functionally, and a suitable application program (card application) becomes active based on card information and callback information 121 to 123 read from the card information storing portion 12 corresponding to each card so that a predetermined function is implemented.

A predetermined storage region of the storage medium such as the HDD which is provided in the portable device 10 is assigned to each of the card information storing portion 12, a seal list storing portion 112 and a seal data storing portion 113. The card information and callback information 121 to 123 make a group of data to be used for each card stored in the card information storing portion 12. Programs, for example, the seal control program (seal manager) 111, the application programs 14 to 16 and the like are stored in the predetermined storage region of the storage medium such as the HDD which is provided in the portable device 10 and are read to the main memory, and the CPU executes the calculation process so that the predetermined function is implemented.

On the assumption of the structure described above, an operation to be executed in accordance with the information processing program according to the present invention will be described with reference to the drawings showing a processing flow illustrated in FIGS. 3 to 12 and flowcharts of FIGS. 13 to 20.

FIGS. 3 to 7 show a processing flow for placing a seal on a card, and the flowcharts of FIGS. 13 and 15 to 17 correspond to the processing flow. With reference to them, description will be given to the processing for placing a seal on a card.

If an operation for selecting any of the cards stored in the card information storing portion 12 is accepted through the touch panel 17 in a state in which the shell (the card and seal control portion 11) is activated in the portable device 10 (S01 in FIG. 13), a corresponding one of the card information (one of the card information and callback information 121 to 123) is read from the card information storing portion 12 (S02 in FIG. 1a).

Figure 13:
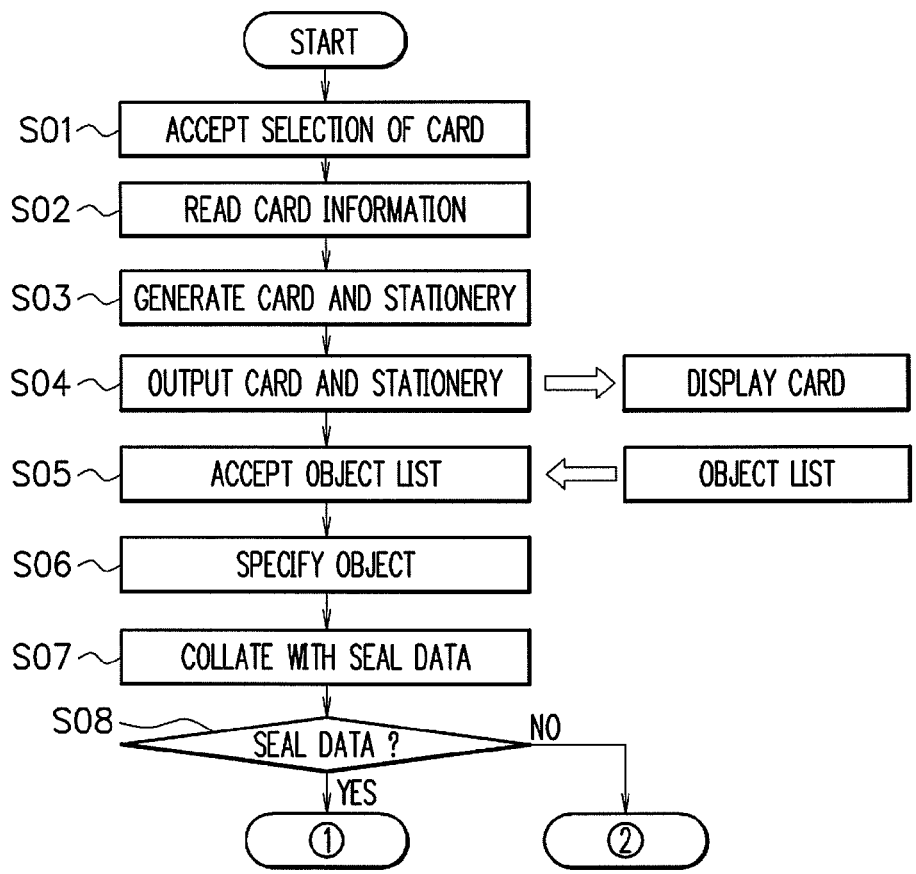
FIG. 13 is a first flowchart showing a processing flow for displaying a card and putting a seal in accordance with the information processing program according to the present invention.
Figure 23:
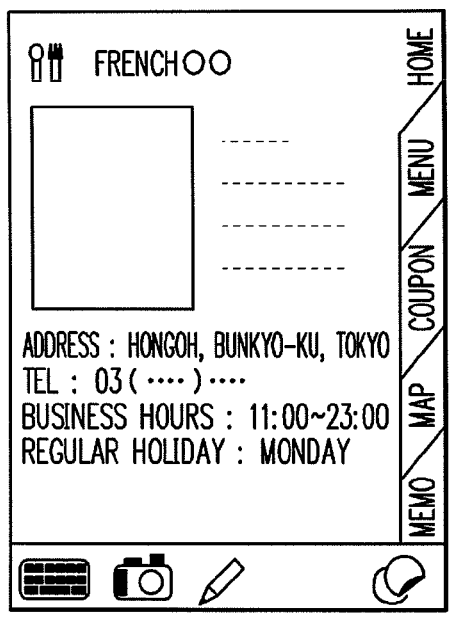
FIG. 23 is a first view showing an example of a transition of a seal selecting screen to be displayed on a display in accordance with the information processing program according to the present invention.

A card which is equivalent to a screen on the display 18 and a stationery serving as a tool bar to be displayed in a lower part of the display 18 in an overlap with the card are generated from the card information which is read (S03 in FIG. 13), and are output to the display 18 (S04 in FIG. 13). FIG. 23 shows an example of the card and the stationery which are output to the display 18, and a stationery serving as a tool bar for executing a predetermined operation (writing data, placing a seal or the like) over a card for displaying information about a restaurant is displayed on the card.

The stationery to be displayed herein is controlled by the shell (the card and seal control portion 11). However, a display state of the card or an operation to be executed for each card (an operation for reading information from a URI included in the card information, an operation for calling a callback of "Notify" registered in the card which will be described below or the like) is controlled by the card display control portion 13 for each card separately from the shell.

The flowchart of FIG. 13 shows Steps S05 to S08 for confirming whether a seal is placed on an output card or not. The steps will be described in a flow of a subsequent processing for displaying a card on which a seal is placed. On the assumption that a seal is first placed on a card having no seal placed thereon, a flow of the case in which a seal button displayed on the stationery is selected as shown in FIG. 3 will be described with reference to the flowchart of FIG. 15.

Figure 3:
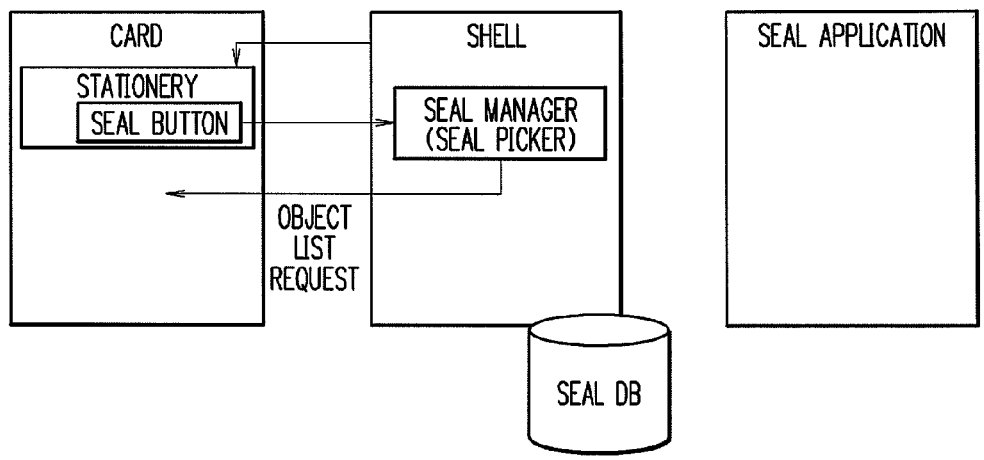
FIG. 3 is a first diagram showing a processing flow for putting a seal on a card in accordance with an information processing program according to the present invention.
Figure 15:
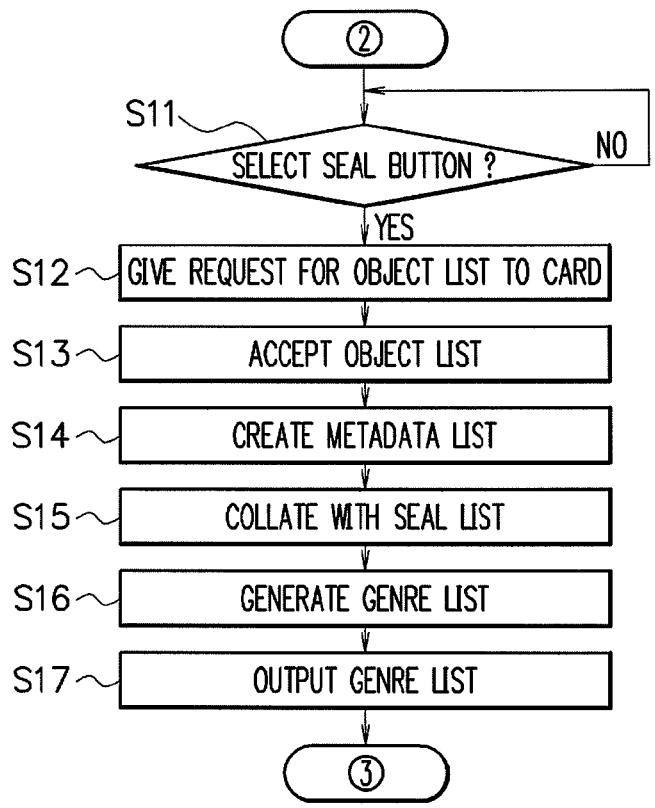
FIG. 15 is a third flowchart showing the processing flow for displaying a card and putting a seal in accordance with the information processing program according to the present invention.

When an operation for selecting the seal button for placing a seal which is displayed on the stationery as shown in FIG. 3 is accepted from the touch panel 17 (S11 in FIG. 15), a request for an object list of the displayed card is given to the card display control portion 13 for controlling the displayed card from the seal control program (seal manager) 111 of the shell (the card and seal control portion 11) controlling the stationery (there is operated a seal picker for selecting and placing a seal included in the seal manager) (S12 in FIG. 15).

The requested object list indicates a list for all objects displayed on the card. The object indicates a unit which is intended for placing a seal, and includes information about metadata and a set thereof, a region displayed on the display 18, the URI and the like. The card display control portion 13 returns the object list of the displayed card to the seal control program (seal manager) 111 of the shell (the card and seal control portion 11).

Figure 4:
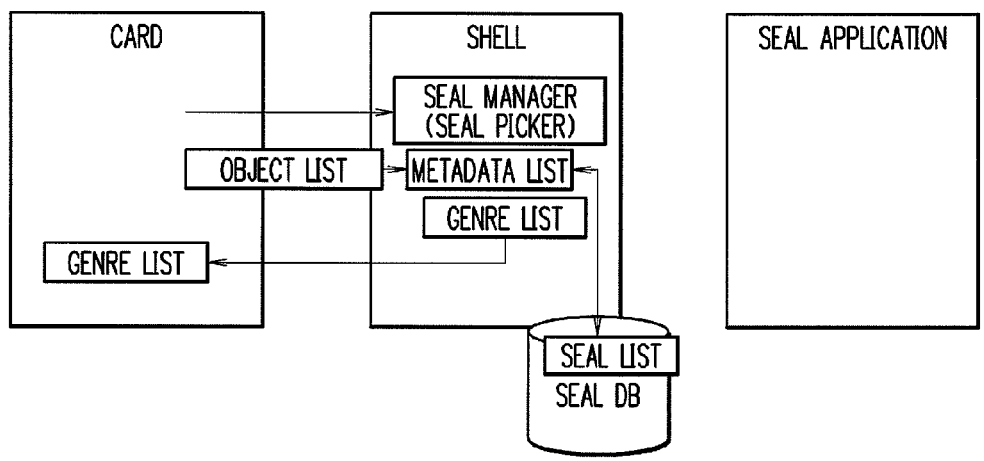
FIG. 4 is a second diagram showing the processing flow for putting a seal on a card in accordance with the information processing program according to the present invention.

When the seal control program (seal manager) 111 accepts the object list of the displayed card (S13 in FIG. 15), a genre list of the seals which can be placed is displayed on the display 18 in accordance with the flow shown in FIG. 4.

In other words, the seal control program (seal manager) 111 extracts the metadata present in the accepted object list from the same object list and creates a metadata list (S14 in FIG. 15). The metadata list is collated with a seal list stored in the seal list storing portion 112 (included in a seal DB) (S15 in FIG. 15). A genre including a type of a seal which can be placed is read for the metadata contained in the metadata list from the seal list storing portion 112, and a genre list of the genre including the type of the seal which can be placed is generated (S16 in FIG. 15) and is output to the display 18 (S17 in FIG. 15).

FIG. 21 shows an example of a table in which the metadata and the type of the seal which can be placed (a seal ID for identifying the seal) in the seal list storing portion 112 are associated with each other. A method of associating the metadata with the genre and the type of the seal is not restricted to this example. However, the seal list storing portion 112 stores the types of the seals which can be placed for each type of the metadata and the genre including the types of the seals in association with each other.

Figure 24:
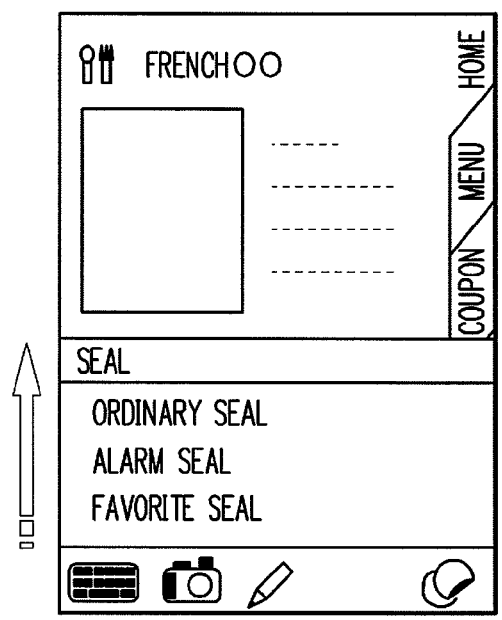
FIG. 24 is a second view showing the example of the transition of the seal selecting screen to be displayed on the display in accordance with the information processing program according to the present invention.

FIG. 24 shows an example in which a genre list of a seal which can be placed on a card output to the display 18 is overlapped with the card. A method of displaying the genre list is not particularly restricted. In this example, however, the genre list is displayed in an animation so as to be extended upward from the stationery.

When an operation for selecting any of the genres from the displayed genre list is accepted through the touch panel 17 (S18 in FIG. 16), subsequently, a design list of the seal which can be placed is displayed on the display 18 in accordance with the flow shown in FIG. 5.

Figure 16:
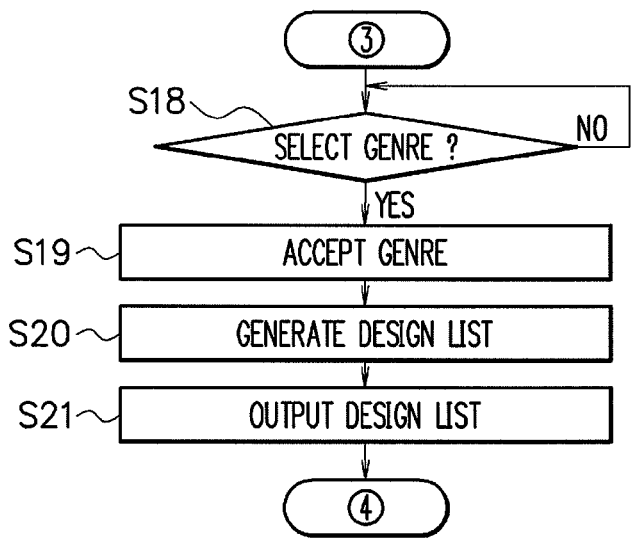
FIG. 16 is a fourth flowchart showing the processing flow for displaying a card and putting a seal in accordance with the information processing program according to the present invention.

In other words, when the seal control program (seal manager) 111 accepts the selected genre (S19 in FIG. 16), a design list of a corresponding seal to a type of a seal which can be placed for the selected genre is generated in the displayed card (S20 in FIG. 16) and is output to the display 18 (S21 in FIG. 16). In order to specify the type of the seal which can be placed for the selected genre, it is also possible to read the type of the seal which is included in the genre selected from the seal list stored in the seal list storing portion 112. Since the type of the seal which can be placed is specified corresponding to the respective metadata when the genre list is generated in advance, however, it is also possible to temporarily store and utilize the information about the specified type of the seal.

FIG. 25 shows an example in which the design list of the seal which can be placed on the card is overlapped with the card output to the display 18. A method of displaying the design list is not particularly restricted. In this example, however, the design list is displayed in an animation so as to be extended upward from the stationery. In the case in which the seals which can be placed cannot be perfectly displayed in one page, it is also possible to provide a page switching button in a lower part of the design list.

The design of the seal to be displayed in the design list is determined depending on the type of the seal. For instance, a table in which the type (seal ID) of the seal is associated with a file pass of an image file corresponding to the design of the seal as shown in the example of FIG. 22 is provided in the seal list storing portion 112, and the image files for displaying the design of the seals are read with reference to the table, thereby outputting the image files as the design list.

Subsequently, an operation for selecting any of the designs from the displayed design list is accepted through the touch panel 17 (S22 in FIG. 17). In the seal control program (seal manager) 111 accepting the operation, it is possible to specify the metadata corresponding to the selected seal from the type (seal ID) of the seal which is suitable for the selected design. By specifying the object corresponding to the metadata based on the object list accepted from the card display control portion 13 in advance, it is possible to specify a display region of the specified object as a region on which the seal can be placed (S23 in FIG. 17).

Consequently, it is also possible to specify a region on which the seal cannot be placed. Therefore, information about the region is transferred to the card display control portion 13 to change the display state, for example, to change the display of the display 18 to be dark (S24 in FIG. 17). By causing the region on which the seal can be placed to be visually observed in the display state of the card in the display 18, a user can easily execute an operation for placing the seal.

The operation for placing a seal on a card by the user is not particularly restricted. For example, it is possible to touch and drag one of the seals displayed in the design list through the touch panel 17, to select a position on the display 18 where the seal is to be placed, and to designate an object on which the seal is to be placed and a position in which the seal is to be placed based on information about the selected position. The information about the seal to be placed (displayed) on the card thus selected is written, as seal data, to the seal data storing portion 113 (included in the seal DB) as shown in FIG. 6.

When the selection of the seal and the disposition on the display 18 are carried out as described above, the seal control program (seal manager) 111 accepts data including the type (seal ID) of the selected seal. The metadata contained in the object in which the seal is disposed and the position information about the position on which the seal is placed (S25 in FIG. 17), generates, from the data, seal data including the type of the seal, the metadata to be a target and the display position of the seal which are required for displaying the seal on the card (S26 in FIG. 17) and writes the seal data to the seal data storing portion 113 (S27 in FIG. 17).

Figure 7:
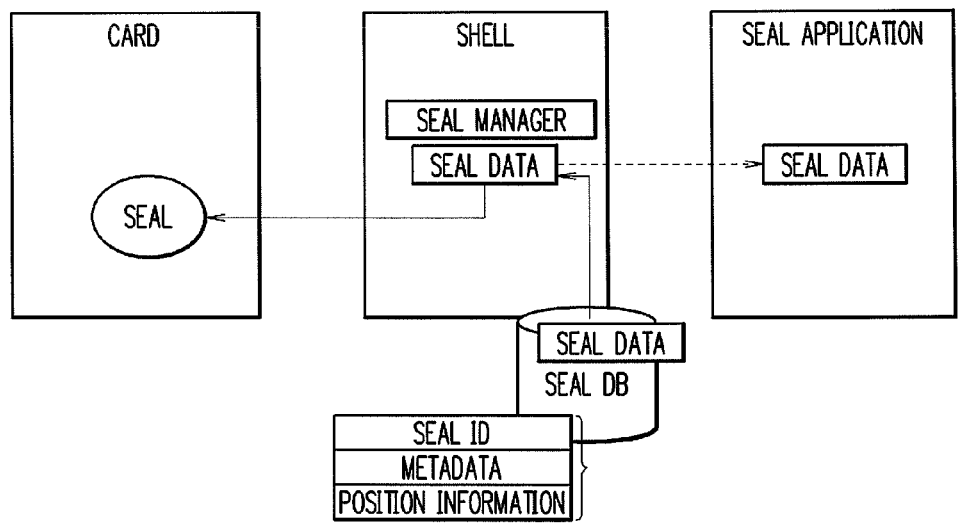
FIG. 7 is a fifth diagram showing the processing flow for putting a seal on a card in accordance with the information processing program according to the present invention.

Furthermore, as shown in FIG. 7, the seal data are also transferred to the card display control portion 13 (S28 in FIG. 17) and an image corresponding to the type of the seal is drawn in a predetermined display position of an object corresponding to the metadata and is output to the display 18. In order to control an action to be executed by the seal which is placed in accordance with the seal application, it is also possible to transfer the seal data to a corresponding one of the seal applications (one of the application programs 14 to 16).

Figure 8:
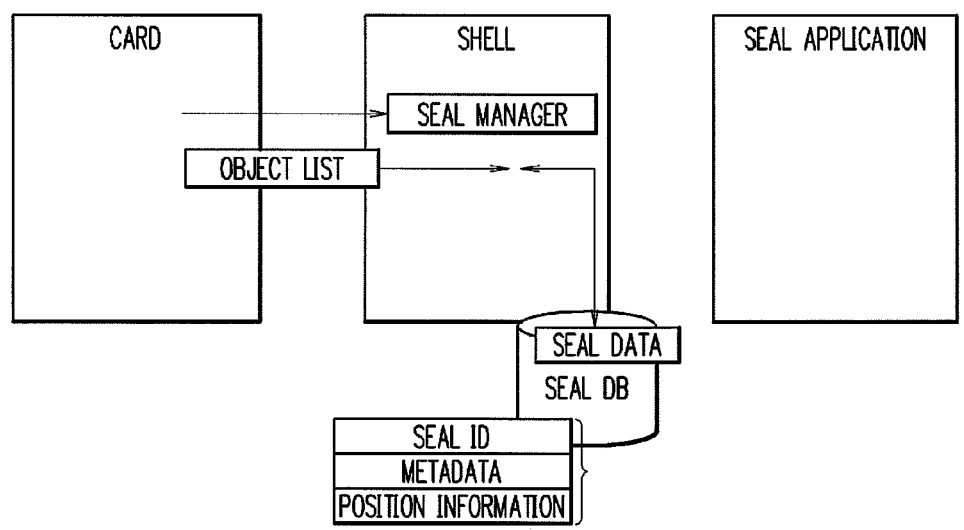
FIG. 8 is a first diagram showing a processing flow for displaying a card having a seal put thereon in accordance with the information processing program according to the present invention.
Figure 9:
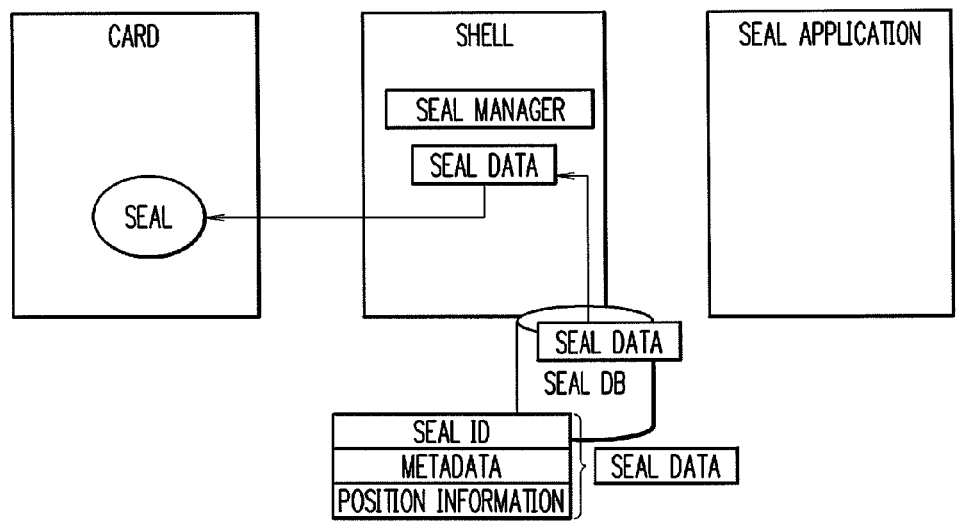
FIG. 9 is a second diagram showing the processing flow for displaying a card having a seal put thereon in accordance with the information processing program according to the present invention.
Figure 14:
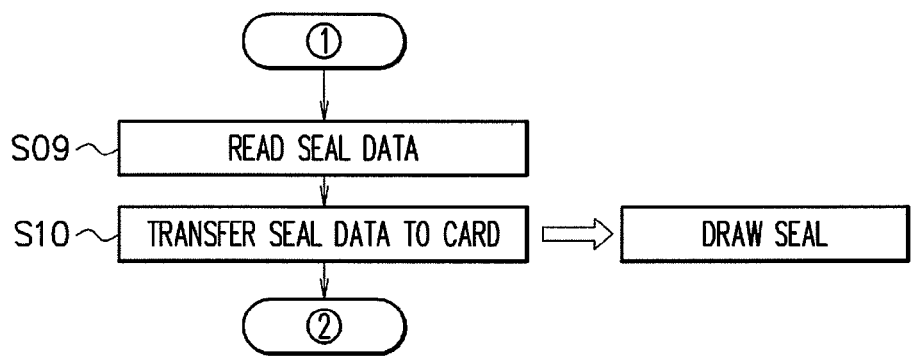
FIG. 14 is a second flowchart showing the processing flow for displaying a card and putting a seal in accordance with the information processing program according to the present invention.

FIGS. 8 and 9 show a processing flow for displaying a card on which a seal is placed. FIGS. 13 and 14 are flowcharts corresponding to this processing flow. By using them, description will be given to the processing for displaying a card on which a seal is placed.

A processing flow for accepting an operation for selecting a card through the touch panel 17 (S01 in FIG. 13) and outputting the card and a stationery to the display 18 (S04 in FIG. 13) in the portable device 10 is carried out as described above in the processing flow for placing a seal on a card. There is executed a step of confirming whether the seal is placed on the card to be output or not as shown in S05 to S08 of FIG. 13.

When the card is displayed by the card display control portion 13, the object list of the displayed card is transferred to the seal control program (seal manager) 111 by the card display control portion 13 as shown in FIG. 8 (S05). Contents of the object list to be transferred have been described above in the flow of the processing for placing a seal on a card.

The seal control program (seal manager) 111 specifies an object included in the accepted object list from the same object list (S06 in FIG. 13), collates the specified object with each of the seal data stored in the seal data storing portion 113 (included in the seal DB) (S07 in FIG. 13) and executes a process for retrieving whether there are seal data corresponding to the object included in the displayed card or not (S08 in FIG. 13), that is, a process for confirming whether any seal is placed on the displayed card or not.

A method of confirming whether any seal is placed on the displayed card or not is not particularly restricted. In order to retrieve the corresponding seal data by setting the object to be a key as described above, however, it is preferable to record, in the seal data, an object ID (for example, a URI) for identifying an object to which a seal is attached. Even if the object ID is not used, it is also possible to identify the object from the metadata included in the object, a set of the data and the like. In addition, by recording a card ID for identifying a card when writing the seal data to the seal data storing portion 113, for example, it is possible to specify the seal data on the placed seal based on the presence of the seal data having the card ID recorded therein even if the metadata are not retrieved as described above.

As described above, if it is not confirmed that any seal is placed on the displayed card, the seal is not drawn but there is made a transition to the process described above with reference to the flowchart of FIG. 15. If it is confirmed that any seal is placed on the displayed card, seal data corresponding to the placed seal are read from the seal data storing portion 113 (included in the seal DB)(S09 in FIG. 14) and are transferred to the card display control portion 13 (S10 in FIG. 14) so that an image corresponding to a type of the seal is drawn in a predetermined display position of an object corresponding to the metadata and is output to the display 18 as shown in FIG. 9.

Figure 10:
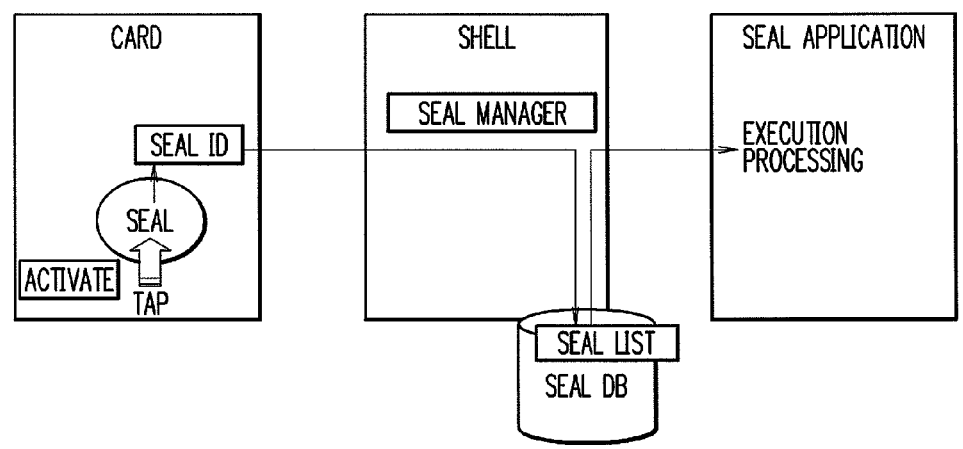
FIG. 10 is a diagram showing a processing flow for executing a predetermined action by setting a tap of a seal as a trigger in accordance with the information processing program according to the present invention.
Figure 20:
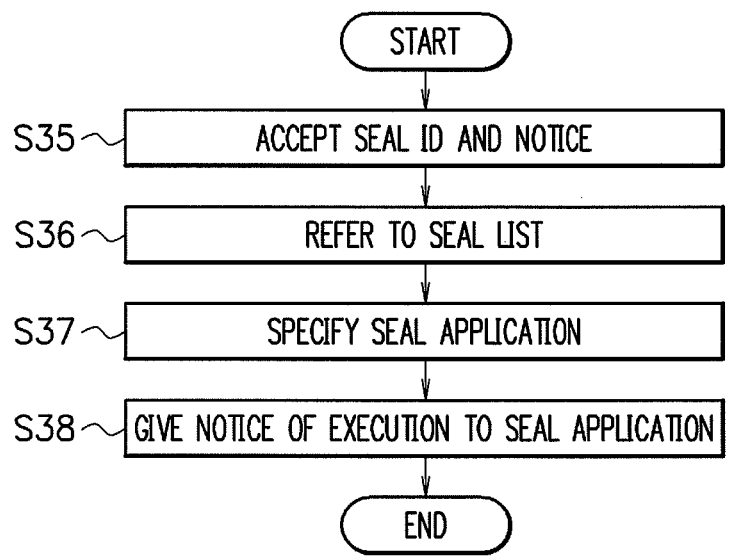
FIG. 20 is a third flowchart showing the processing flow for activating to execute a predetermined action in accordance with the information processing program according to the present invention.

FIG. 10 shows a processing flow for executing a predetermined action by setting a tap of a seal as a trigger. FIGS. 18 and 20 are flowcharts corresponding to this process. By using them, description will be given to the process for executing a predetermined action by using a tap of a seal as a trigger.

FIG. 18 shows a processing flow to be executed in the card display control portion 13. It is detected, by the card display control portion 13, that the touch panel 17 accepts the tap of the seal placed (drawn) on the card in a state in which any of the cards is displayed on the display 18 (S29 in FIG. 18). If a callback of "Activate" (a callback caused when a click or a tap is carried out) is registered in the tapped seal and is set as a trigger of an action corresponding to a seal on which a tap of a predetermined object is placed in the displayed card, the card display control portion 13 calls the callback so that a notice of a type (seal ID) of the tapped seal is given to the shell (the card and seal control portion 11) (S31 in FIG. 18).

In order to call the callback for the seal by setting, as the trigger, the tap of the object or the like as described above, it is necessary to set any condition that the callback is called in each of the cards. For this reason, each of the card information stored in the card information storing portion 12 stores the condition for calling the callback or the like as callback information in addition to data for displaying the card (the card information and callback information 121 to 123).

FIG. 20 shows a processing flow to be executed in the shell (the card and seal control portion 11) upon receipt of the notice. When the notice of the type (seal ID) of the seal is accepted in the shell (the card and seal control portion 11) (S35 in FIG. 20), and the seal list storing portion 112 is referred (S36 in FIG. 20), the seal application (one of the application programs 14 to 16) corresponding to the type (seal ID) of the seal thus accepted is specified (S37 in FIG. 20).

A method of specifying the seal application is not particularly restricted but it is preferable to provide, in the seal list storing portion 112, a table in which a type of a seal (seal ID) is associated with a file pass of a file for an application program corresponding to a seal application as shown in an example of FIG. 22 and to specify the seal application by referring to the table, for instance. An activating instruction for a process for executing a predetermined action is given to the specified seal application (S38 in FIG. 20) and a predetermined action for outputting information associated with an object on which a seal is placed, outputting a sound effect, starting a sound recording operation or the like is executed through the seal application (one of the application programs 14 to 16).

Figure 19:
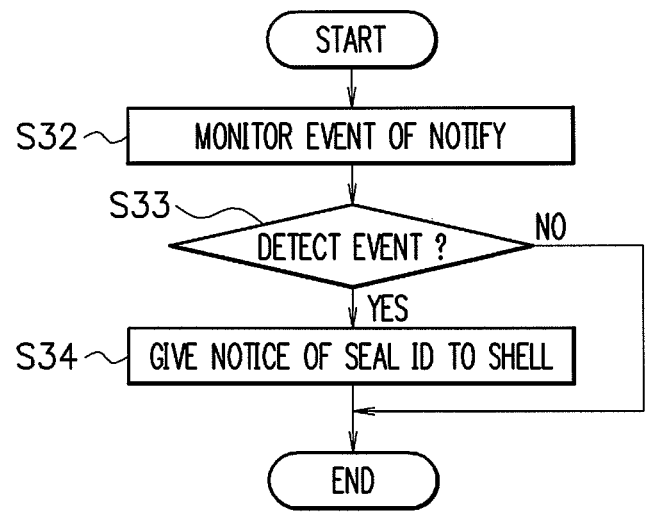
FIG. 19 is a second flowchart showing the processing flow for activating to execute a predetermined action in accordance with the information processing program according to the present invention.

FIGS. 11 and 12 show a processing flow for executing a predetermined action by setting a predetermined event as a trigger. FIGS. 19 and 20 are flowcharts corresponding to this process. By using them, description will be given to the process for executing a predetermined action by setting a predetermined event as a trigger.

FIG. 19 shows a processing flow to be executed in the card display control portion 13. A callback of "Notify" (a callback given spontaneously by the card) is registered in the seal placed on the card in a state in which any of the cards is active, and a generation of a predetermined event is set as a trigger of an action corresponding to the seal placed in the displayed card. As shown in FIG. 11, consequently, the predetermined event is monitored by the card display control portion 13 (S32 in FIG. 19). For example, an arrival of a date specified by an object having a seal placed thereon is monitored through a clock function or an approach to an address specified by the object having the seal placed thereon is monitored through a GPS function.

In order to call the callback for the seal by setting, as a trigger, an arrival of a predetermined date, an approach to a predetermined address or the like as described above, it is necessary to set a generation of any event for calling the callback in each of the cards. For this reason, the condition for calling the callback or the like is stored as the callback information in each of the card information stored in the card information storing portion 12 in addition to data for displaying the card (the card information and callback information 121 to 123). If a card having a generation of a predetermined event set as a trigger is active (a state in which the card is active is not restricted to a state in which the card is displayed), a service for monitoring an event or the like is executed in the card display control portion 13.

When it is detected that an event which is being monitored is generated (S33 in FIG. 19), a notice of a type (seal ID) of a seal in which the event is generated is given to the shell (the card and seal control portion 11) (S34 in FIG. 19). In the shell (the card and seal control portion 11) receiving the notice, there is carried out a process for causing the seal application to execute a predetermined action as shown in FIG. 12. However, a specific processing flow is the same as that in the description with reference to the flowchart of FIG. 20.

Although there have been described the two patterns of the flow for executing a predetermined action through the seal application (the application programs 14 to 16), it is preferable to carry out a registration in a seal to be placed on a card so as to enable a compatibility with various callbacks in such a manner that an action based on the seal application can be executed corresponding to various operations on the card side. For example, it is also possible to register, in the seal, a callback (Tick) to be called when a certain period passes, a callback (Create) to be called when a seal is created (placed), a callback (Destroy) to be called when the seal is deleted (removed) or the like.

In addition to the above description, it is also possible to control a movement or deletion of a seal by the shell (the card and seal control portion 11).

For instance, referring to the movement of the seal, the touch panel 17 detects that a user carries out a predetermined operation, for example, they press the seal displayed on the card for a while. Then the card display control portion 13 stops an operation for drawing the seal, and furthermore, transfers the seal data to the seal control program (seal manager) 111 (there is operated a seal editor for deleting or moving a seal included in the seal manager) so that the seal control program (seal manager) 111 overlays the seal.

When the user carries out an operation for moving the seal through a touching and dragging operation or the like, the touch panel 17 detects the operation and transfers information about a moved position to the seal control program (seal manager) 111. The seal control program (seal manager) 111 writes the seal data on the moved seal to the seal data storing portion 113 in the same manner as in the case in which the seal is placed on the card.

Furthermore, the seal data obtained after the movement are returned to the card display control portion 13 and the moved seal is drawn and output to the display 18. In addition, the seal control program (seal manager) 111 deletes the corresponding seal data from the seal data storing portion 113 so that the seal editing work is completed.

As described above, in the present invention, the seal application for executing the predetermined action has an independent structure of the card which has a single function and is displayed on the display 18. Therefore, it is possible to control the association of the card and the seal through the shell without depending on the application (the scheduler or the mailer) in which there is operated an action capable of being executed for a predetermined event in the same manner as the conventional scheduler or mailer. Thus, it is possible to flexibly set a combination of an event and an action to be executed.

Moreover, the action to be executed is drawn as a seal with which each of the actions is imagined over the card. Therefore, it is also possible to produce an advantage that a user can visually grasp an event of which notice or the like is set and a type of an action to be executed.

The text of Japanese priority application No. 2009-229152 filed on Sep. 30, 2009, is hereby incorporated by reference.

What is claimed is:

1. An information processing program for executing a predetermined action corresponding to a seal displayed on a card screen displayed on a display, comprising:
an information processing device including card information storing portion for storing card information to be used for generating a certain card screen to be displayed on the display, an action information storing portion for associating a type of a seal to be displayed for indicating an association with a predetermined action on the card screen displayed with a program for executing a predetermined action corresponding to the type of the seal for the seal and storing them, and a seal display information storing portion for storing seal display information to be used for displaying the seal on a predetermined region of the card screen displayed based on the card information being caused to execute the following steps:
a card information reading step of reading one of the card information from the card information storing portion when accepting a designation of the card information;
a seal information reading step of reading, from the seal display information storing portion, seal display information about a seal displayed on the card screen displayed based on the card information read by the card information reading step;
a card screen outputting step of drawing the seal based on the seal display information read at the seal information reading step over the card screen generated in accordance with the card information read at the card information reading step and outputting the seal to the display;
a program specifying step of specifying a type of a seal corresponding to the seal display information and specifying a program associated with the type of the seal in the action information storing portion when detecting a generation of a predetermined event associated with a predetermined region of the card screen on which the seal is to be displayed based on the seal display information stored in the seal display information storing portion; and
an action executing step of causing the program specified at the program specifying step to execute a process related to a predetermined action;
wherein in the information processing device, the card information stored in the card information storing portion includes at least one metadata and the seal display information stored in the seal display information storing portion has a type of a seal to be displayed which is specified by the metadata included in the card information, and the information processing device is provided with seal type information storing portion for storing the type of the seal which can be displayed on the card screen for each metadata included in the card information and the information processing device is caused to execute the following steps;
a seal list outputting step of identifying the metadata included in can information corresponding to the card screen displayed on the display from the card information, reading the type of the seal which can be displayed on the card screen corresponding to the metadata from the seal type information storing portion, and generating a list of the seals which can be displayed and outputting the list of seals to the card screen; and
a seal display information writing step of writing, to the seal display information storing portion, new seal display information to be used for displaying a seal selected in the seal list of seals on the card screen;
a seal selection accepting step of accepting a selection of one of the seals from the seals output at the outputting the list of seals step;
a position information selection accepting step of accepting a selection of predetermined position information on the display as a display position for the seal in a state in which the seal is selected;
new seal display information is written step by setting the seal accepted to be selected at the seal selection accepting step as a seal to be displayed on a corresponding region to the position information at the seal display information writing step;
a metadata specifying step of specifying metadata which can be displayed for a type of one of the seals selected by referring to the seal type information storing portion when accepting the selection of the seal at the seal selection accepting step;

a display state changing step of specifying a corresponding display region to the metadata specified at the metadata specifying step from card information corresponding to the card screen displayed on the display and changing a display state of the card screen so as to enable an identification of the display region; and further new seal display information is written at the seal display information writing step when accepting, at the position information selection accepting step, a selection of position information included in the display region corresponding to the metadata specified at the display state changing step.

2. The program of claim 1, wherein the changing a display state of the card screen so as to enable an identification of the display region comprises changing the display state of the card screen to be dark.

3. An information processing device for executing a predetermined action corresponding to a seal displayed on a card screen that is displayed on a displayed on a display, comprising:

a card information storing means for storing card information to be used for generating a certain card screen to be displayed on a display;

an action information storing portion for associating a type of a seal to be displayed for indicating an association with a predetermined action on the card screen displayed on the display with a program for executing a predetermined action corresponding to the type of the seal for the seal and storing them;

seal display information storing portion for storing seal display information to be used for displaying the seal on a predetermined region of the card screen displayed on the display based on the card information;

a card information reading portion for reading one of the card information from the card information storing portion when accepting a designation of the card information;

a seal information reading portion for reading, from the seal display information storing portion, seal display information about a seal displayed on the card screen displayed based on the card information read by the card information reading portion;

a card screen outputting portion for drawing the seal based on the seal display information read by the seal display information reading portion over the card screen generated in accordance with the card information read by the card information reading portion and outputting the seal to the display;

a program specifying portion for specifying a type of a seal corresponding to the seal display information and specifying a program associated with the type of the seal in the action information storing portion when detecting a generation of a predetermined event associated with a predetermined region of the card screen on which the seal is to be displayed based on the seal display information stored in the seal display information storing means; and an action executing portion for causing the program specified by the program specifying portion to execute a process related to a predetermined action;

wherein the card information stored in the card information storing portion includes at least one metadata;

wherein the seal display information stored in the seal display information storing portion has a type of a seal to be displayed which is specified by the metadata included in the card information;

a seal type information storing portion for storing the type of a seal which can be displayed on the card screen for each metadata included in the card information;

a seal list outputting portion for identifying the metadata included in card information corresponding to the card screen displayed on the display from the card information, reading a type of a seal which can be displayed on the card screen corresponding to the metadata from the seal type information storing portion, and generating a list of a seals which can be displayed and outputting the list of seals to the card screen;

a seal display information writing portion for writing, to the seal display information storing portion, new seal display information to be used for displaying a seal selected in the list of seals on the card screen;

a seal selection accepting portion for accepting a selection of one of the seals from the list of seals output to the seal list outputting portion;

a position information selection accepting portion for accepting a selection of predetermined position information on the display as a display position for the seal in a state in which the seal is selected;

wherein the seal display information writing portion writing new seal display information by setting the seal accepted to be selected in the seal selection accepting portion as a seal to be displayed on a corresponding region to the position information;

a metadata specifying portion for specifying metadata which can be displayed for a type of one of the seals selected by referring to the seal type information storing portion when the seal selection accepting means accepts the selection of the seal; and a display state changing portion for specifying a corresponding display region to the metadata specified by the metadata specifying portion based on card information corresponding to the card screen displayed on the display and changing a display state of the card screen so as to enable an identification of the display region;

wherein the seal display information writing portion writing new seal display information when the position information selection accepting portion accepts a selection of position information included in the display region corresponding to the metadata specified by the display state changing portion.

4. The device of claim 3, wherein the changing a display state of the card screen so as to enable an identification of the display region comprises changing the display state of the card screen to be dark.

* * * * *